United States Patent
Nakata et al.

(10) Patent No.: US 9,282,491 B2
(45) Date of Patent: Mar. 8, 2016

(54) BASE STATION GATEWAY APPARATUS, WIRELESS COMMUNICATION SYSTEM AND COMMUNICATION METHOD

(71) Applicant: NEC CORPORATION, Tokyo (JP)

(72) Inventors: Atsushi Nakata, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/384,021

(22) PCT Filed: Feb. 14, 2013

(86) PCT No.: PCT/JP2013/053508
§ 371 (c)(1),
(2) Date: Sep. 9, 2014

(87) PCT Pub. No.: WO2013/153854
PCT Pub. Date: Oct. 17, 2013

(65) Prior Publication Data
US 2015/0038145 A1    Feb. 5, 2015

(30) Foreign Application Priority Data
Apr. 9, 2012    (JP) .................................. 2012-088271

(51) Int. Cl.
*H04W 36/00*    (2009.01)
*H04W 84/04*    (2009.01)
*H04W 88/12*    (2009.01)

(52) U.S. Cl.
CPC ........ *H04W 36/0055* (2013.01); *H04W 84/045* (2013.01); *H04W 88/12* (2013.01)

(58) Field of Classification Search
USPC ........................................................ 455/436
See application file for complete search history.

(56) References Cited

U.S. PATENT DOCUMENTS

| 2011/0223919 | A1 * | 9/2011 | Vikberg | ................ H04W 36/08 455/436 |
| 2011/0274086 | A1 | 11/2011 | Xu | |
| 2011/0286429 | A1 | 11/2011 | Vikberg et al. | |

FOREIGN PATENT DOCUMENTS

| JP | 2009-171543 | 7/2009 |
| JP | 2010-536293 | 11/2010 |

(Continued)

OTHER PUBLICATIONS

3GPP TS 23.401 V10.5.0 (Sep. 2011), 3rd Generation Partnership Project; Technical Specification Group Services and System Aspects; General Packet Radio Service (GPRS) enhancements for Evolved Universal Terrestrial Radio Access Network (E-UTRAN) access (Release 10).

(Continued)

*Primary Examiner* — Joel Ajayi
(74) *Attorney, Agent, or Firm* — Young & Thompson

(57) ABSTRACT

A disclosed base station gateway apparatus has a C-plane processing unit and a U-plane processing unit. When a mobile station performs handover from a subordinate source base station to a subordinate target base station, the C-plane processing unit terminates S1AP signaling received from the source base station and the target base station without relaying the S1AP signaling to a mobility management apparatus. The U-plane processing unit inserts, into U-plane data that is received from a serving gateway apparatus and that is to be transferred to the source base station, an end marker indicating that the U-plane data is the last data at a predetermined timing, and switches the transfer destination of the U-plane data, received from the serving gateway apparatus, from the source base station to the target base station at a timing immediately after the end marker is inserted.

12 Claims, 8 Drawing Sheets

(56) References Cited

FOREIGN PATENT DOCUMENTS

| JP | 2011-041237 | 2/2011 |
|----|-------------|--------|
| WO | 2010-059100 | 5/2010 |
| WO | 2011021600  | 2/2011 |
| WO | 2011021602  | 2/2011 |

OTHER PUBLICATIONS

3GPP TS 36.300 V10.5.0 (Sep. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TSG RAN WG3 Meeting #70 R3-103425, "X2 Handover termination at the HeNB GW", Samsung, Alcatel-Lucent, CATT, CMCC, Nov. 19, 2010.

Extended European search report, dated Dec. 21, 2015; Application No. 13776343.9.

NTT Docomo et al., "Way forward on Handover termination at HeNB-GW," 3GPP Draft; R3-103442, 3RD Generation Partnership Project, vol. RAN WG3, Nov. 9, 2010.

NEC et al., "Optimized HNB to HNB mobility (HNB-GW based solution)," 3GPP Draft; R3-101728-Optimized HNB to HNB Mobility GW Based-Disc, 3RD Generation Partnership Project, vol. RAN WG3, May 17, 2010.

* cited by examiner

BASE STATION GATEWAY APPARATUS, WIRELESS COMMUNICATION SYSTEM AND COMMUNICATION METHOD

TECHNICAL FIELD

The present invention relates to a base station gateway apparatus, a wireless communication system and a communication method.

BACKGROUND ART

In an LTE (Long Term Evolution) system, UE (user equipment) may perform Intra HeNBGW Inter HeNB Handover (handover between HeNBs in HeNBGW) for moving from a Source HeNB to a Target HeNB under the same HeNBGW (Home-eNB GateWay).

Description will be made below on an operation in the case of performing S1 Based Handover (an operation example 1) and an operation in the case of performing X2 Based Handover (an operation example 2) as the Intra HeNBGW Inter HeNB Handover on the basis of Section 10.1.2.1.1 and Section 10.1.2.2 of Non-Patent Literature 1 (TS36.300 version 10.5.0) and Section 5.5 of Non-Patent Literature 2 (TS23.401 version 10.5.0) (hereinafter these will be referred to as the description of 3GPP).

(A) Operation Example 1

First, description will be made on the operation in the case of performing Intra HeNBGW Inter HeNB S1 Based Handover using S1 interfaces between HeNB and HeNBGW and between HeNBGW and MME (Mobility Management Entity)/S-GW (Serving Gateway) in an LTE system in accordance with the description of 3GPP and with reference to FIG. 1.

(S0001) First, Downlink User Plane Data is transmitted from S-GW to Source HeNB via HeNBGW U (User)-Plane and further transmitted to UE.

(S0002) Source HeNB decides to perform S1 based Handover when UE moves to Target HeNB.

(S0003) Source HeNB transmits an S1AP: Handover Required message to HeNBGW C (Control)-Plane in order to request movement of UE to Target HeNB. HeNBGW C-Plane transfers this S1AP: Handover Required message to MME.

(S0004) MME finds out that Target HeNB is a HeNB under the same HeNBGW based on the S1AP: Handover Required message received at S0003, and MME transmits an S1AP: Handover Request message to HeNBGW that controls Target HeNB in response. Here, MME is required to predict in advance that handover, in which handover source and handover destination is the same, is to be performed before operating. HeNBGW transfers this S1AP: Handover Request message to Target HeNB. An MME UE S1AP ID identifying UE in the S1AP: Handover Request message is a part of combination of an MME UE S1AP ID and an eNB UE S1AP ID, which are an identifier of UE in the S1AP: Handover Required message received at S0003. Thus, in general, HeNBGW cannot identify UEs targeted by both messages as the same UE. Therefore, HeNBGW recognizes the UEs as separate UEs and secures network resources, for Source HeNB of UE targeted by the S1AP: Handover Required message, and network resources, for Target HeNB of UE targeted by the S1AP: Handover Request message, separately.

(S0005) Target HeNB returns an S1AP: Handover Request Acknowledge message to MME via HeNBGW C-Plane as a response to the S1AP: Handover Request message received at S0004.

(S0006) When receiving the Handover Request Acknowledge message at S0005, MME transmits an S1AP: Handover Command message to Source HeNB via HeNBGW.

(S0007) When receiving the S1AP: Handover Command message at S0006, Source HeNB transmits an RRC (Radio Resource Control) Connection Reconfiguration message to UE.

(S0008) Source HeNB transmits an S1AP: eNB Status Transfer message to MME via HeNBGW C-Plane in order to transfer Transparent Container to Target HeNB.

(S0009) MME replaces the S1AP: eNB Status Transfer message received at S0008 with an S1AP: MME Status Transfer message and transmits the message to Target HeNB via HeNBGW C-Plane.

(S0010) Source HeNB does not transmit Downlink User Plane Data, already received from S-GW via HeNBGW U-Plane, to UE but starts Data Forwarding for forwarding the data to Target HeNB.

(S0011) When having successfully moved between HeNBs, UE transmits an RRC Connection Reconfiguration Complete message to Target HeNB.

(S0012) When receiving the RRC Connection Reconfiguration Complete message at S0011, Target HeNB transmits an S1AP: Handover Notify message to MME via HeNBGW C-Plane in order to notify completion of the handover.

(S2001) When receiving the S1AP: Handover Notify message at S0012, MME transmits a Modify Bearer Request message to S-GW in order to switch the GTP tunnel between S-GW and HeNBGW.

(S2002) S-GW returns a Modify Bearer Response message to MME as a response to the Modify Bearer Request message received at S2001.

(S0013) S-GW inserts an End Marker, that indicates that the data is the last data, into Downlink User Plane Data and transmits it to the GTP tunnel for Source HeNB. HeNBGW U-Plane transfers this Downlink User Plane Data in which the End Marker is inserted, to Source HeNB. Then S-GW does not transmit Downlink User Plane Data to the GTP tunnel of HeNBGW for Source HeNB.

(S0014) In Data Forwarding which has been started at S0010, Source HeNB transmits the Downlink User Plane Data with the End Marker inserted therein, which was received at S0013, to Target HeNB. Target HeNB detects, by the End Marker, that the data is the end of the Downlink User Plane Data which has been received from Source HeNB at and after S0010. Then Target HeNB ensures the order of transfer of Downlink User Plane Data to UE so that Downlink User Plane Data received directly from HeNBGW U-Plane is transferred to UE.

(S0015) S-GW switches the transfer destination of Downlink User Plane Data from the GTP tunnel of HeNBGW for Source HeNB to the GTP tunnel of HeNB GW for Target HeNB. The switching timing is immediately after inserting the End Marker at S0013. Here, resources between the GTP tunnel between S-GW and HeNBGW are required to be doubly secured. However, if it is assumed that the tunnel between HeNBGW and S-GW is realized by the same GTP tunnel, it is necessary for HeNBGW C-Plane to judge at S0004 that the UEs are the same, and it is also necessary to synchronize the timing of switching of the GTP tunnel between HeNBGWs at HeNBGW U-Plane with the timing of receiving the End Marker. These prescriptions, however, are not specified in the description of 3GPP.

(S0016) In order to complete handover, MME transmits an S1AP: UE Context Release Command message to Source HeNB via HeNBGW C-Plane for the purpose of releasing resources in Source HeNB.

(S0017) Source HeNB returns an S1AP: UE Context Release Complete message to MME via HeNBGW C-Plane as a response to the S1AP: UE Context Release Command message received at S0016. Now, the handover process is completed.

(B) Operation Example 2

Next, description will be made on the operation in the case of performing Intra HeNBGW Inter HeNB X2 Based Handover using an X2 interface between HeNBs in the LTE system, in accordance with the description of 3GPP and with reference to FIG. 2.
(S1001) First, Downlink User Plane Data is transmitted from S-GW to Source HeNB via HeNBGW U-Plane and further transmitted to UE.
(S1002) Source HeNB decides to perform X2 based Handover when UE moves to Target HeNB.
(S1003) Source HeNB transmits an X2AP: Handover Request message to Target HeNB in order to request movement of UE to Target HeNB.
(S1004) Target HeNB returns an X2AP: Handover Request Acknowledge message to Source HeNB as a response to the X2AP: Handover Request message received at S1003.
(S1005) When receiving the X2AP: Handover Request Acknowledge message at S1004, Source HeNB transmits an RRC Connection Reconfiguration message to UE.
(S1006) Source HeNB transmits an X2AP: SN Status Transfer message to Target HeNB in order to transfer Transparent Container to Target HeNB.
(S1007) Source HeNB does not transmit Downlink User Plane Data, already received from S-GW via HeNBGW U-Plane, to UE but starts Data Forwarding for forwarding the data to Target HeNB.
(S1008) When having successfully moved between HeNBs, UE transmits an RRC Connection Reconfiguration Complete message to Target HeNB.
(S1009) When receiving the RRC Connection Reconfiguration Complete message at S1008, Target HeNB transmits an S1AP: Path Switch Request message to MME via HeNBGW C-Plane in order to request completion of the handover and in order to switch the GTP tunnel to an upper node. Here, in order to enable route switching by S-GW at the subsequent S1010, it is necessary for HeNBGW C-Plane to set separate values for the GTP tunnel of HeNBGW U-Plane for Source HeNB and the GTP tunnel of HeNBGW U-Plane for Target HeNB though both GTP tunnels are connected to HeNBGW U-Plane.
(S2001) When receiving the S1AP: Path Switch Request message at S1009, MME transmits a Modify Bearer Request message to S-GW in order to switch the GTP tunnel between S-GW and HeNBGW.
(S2002) S-GW returns a Modify Bearer Response message to MME as a response to the Modify Bearer Request message received at S2001.
(S0010) S-GW inserts an End Marker into Downlink User Plane Data and transmits it to the GTP tunnel of HeNBGW U-Plane for Source HeNB. HeNBGW U-Plane transfers this Downlink User Plane Data, in which the End Marker is inserted, to Source HeNB. Then S-GW does not transmit Downlink User Plane Data to the GTP tunnel of HeNBGW U-Plane for Source HeNB.
(S0011) In Data Forwarding which has been started at S1007, Source HeNB transmits the Downlink User Plane Data with the End Marker inserted therein, which was received at S1010, to Target HeNB. Target HeNB detects, by the End Marker, that the data is the end of the Downlink User Plane Data which has been received from Source HeNB at and after S1007. Then Target HeNB ensures the order of transfer of Downlink User Plane Data to UE so that Downlink User Plane Data, received directly from HeNBGW U-Plane, is transferred to UE.
(S1012) S-GW switches the transfer destination of Downlink User Plane Data to Target HeNB. Here, S-GW transmits the Downlink User Plane Data not to the GTP tunnel of HeNBGW U-Plane for Source HeNB to which transmission was performed at S1001 but to the GTP tunnel of HeNBGW U-Plane for Target HeNB specified from HeNBGW C-Plane to MME at S1009. If it is assumed that the same GTP tunnel as the GTP tunnel of HeNBGW U-Plane for Source HeNB is set as the GTP tunnel of HeNBGW U-Plane for Target HeNB at S1009, it means that S-GW transmits the Downlink User Plane Data for the same HeNBGW, and, therefore, switching of the GTP tunnel is unnecessary. In this case, HeNBGW C-Plane will receive a message at the subsequent S1013 at the timing of switching of the GTP tunnel.
(S1013) MME finds out that Source HeNB is a HeNB under the same HeNBGW based on the S1AP: Path Switch Request message received at S1009, and MME transmits S1AP: Path Switch Request Acknowledge message to Target HeNB via HeNBGW in response.
(S1014) In order to complete handover, Target HeNB transmits an X2AP: UE Context Release message to Source HeNB for the purpose of releasing resources in Source HeNB.

CITATION LIST

Non-Patent Literature

Non-Patent Literature 1: TS23.401 version 10.5.0
Non-Patent Literature 2: TS36.300 version 10.5.0

SUMMARY OF INVENTION

Technical Problem

The operation examples 1 and 2 of the LTE system described above, however, have problems as shown below.

(a) Problems of Operation Example 1

(a-1) The operation example 1 has a problem that C-plane S1AP signaling, transmitted and received between HeNBGW C-Plane and MME at S0003 to S0017, puts pressure on not only the network load but also the processing load of MME.
(a-2) Furthermore, it is not prescribed in the description of 3GPP that it is judged at HeNBGW C-Plane that S0003 and S0004 are C-plane S1AP signaling for the same UE in the operation example 1. Therefore, the operation example 1 has a problem that the network resources between MME and HeNBGW are doubly secured.
(a-3) Furthermore, even if the problem of (a-2) can be solved at HeNBGW in the operation example 1, a method for synchronizing the timing of HeNBGW U-Plane receiving the End Marker inserted at S0013 with the timing of HeNBGW U-Plane switching of the GTP tunnel between HeNBGW and HeNB at S0015 is not prescribed in the description of 3GPP. Therefore, the operation example 1 has a problem in which it is not possible to ensure the order of transfer of the Downlink User Plane Data using the End Marker at Target HeNB at S0014.

(b) Problems of Operation Example 2

(b-1) The operation example 2 has a problem in which C-plane S1AP signaling, transmitted and received between HeNBGW C-Plane and MME at S1009 and S1013, puts pressure on not only the network load but also the processing load of MME.

(b-2) Furthermore, in the operation example 2, it is necessary to secure network resources for Source HeNB and network resources for Target HeNB between HeNBGW U-Plane and MME separately for setting of the End Marker at S1010 and for switching of the GTP tunnel at S1012, which brings about pressure on resources.

(b-3) Furthermore, in the operation example 2, though HeNBGW recognizes that handover has succeeded, at the time of S1009, S-GW performs switching of the GTP tunnel at the time of subsequent S1012. Therefore, the operation example 2 has a problem in which the timing of switching of the GTP tunnel is late, and pressure is put on both of network resources from HeNBGW U-Plane to Source HeNB and network resources from Source HeNB to Target HeNB.

(b-4) Furthermore, the operation example 2 has a problem that, if the same GTP tunnel as the GTP tunnel of HeNBGW U-Plane for Source HeNB is set as the GTP tunnel of HeNBGW U-Plane for Target HeNB at S1009, an error occurs between the timing of S-GW inserting an End Marker and the timing of HeNBGW U-Plane switching of the GTP tunnel (the timing of receiving the S1AP: Path Switch Request Acknowledge message at S1013), and, therefore, it is not possible to ensure the order of transfer of Downlink User Plane Data using an End Marker at Target HeNB at S1011.

Thus, the object of the present invention is to provide a base station gateway apparatus, a wireless communication system and a communication method capable of solving any of the problems described above.

Solution to Problem

A first base station gateway apparatus of the present invention is a base station gateway apparatus that is connected to a mobility management apparatus, a serving gateway apparatus and subordinate base stations and that controls the subordinate base stations, the base station gateway apparatus comprising:
 a C-plane processing unit; and
 a U-plane processing unit; wherein
 when a mobile station performs handover from a subordinate source base station to a subordinate target base station, the C-plane processing unit terminates S1AP signaling received from the source base station and the target base station without relaying the S1AP signaling to the mobility management apparatus; and
 the U-plane processing unit inserts, into U-plane data received from the serving gateway apparatus and to be transferred to the source base station, an end marker indicating that the U-plane data is the last data at a predetermined timing, and
 the U-plane processing unit switches a transfer destination of the U-plane data, received from the serving gateway apparatus, from the source base station to the target base station at a timing immediately after the end marker is inserted.

A second base station gateway apparatus of the present invention is a base station gateway apparatus that is connected to a mobility management apparatus, a serving gateway apparatus and subordinate base stations and that controls the subordinate base stations, the base station gateway apparatus comprising:
 a C-plane processing unit; and
 a U-plane processing unit; wherein
 when a mobile station performs handover from a subordinate source base station to a subordinate target base station, the C-plane processing unit relays S1AP signaling received from the source base station and the target base station to the mobility management apparatus without terminating the S1AP signaling; and
 the U-plane processing unit inserts, into U-plane data received from the serving gateway apparatus and to be transferred to the source base station, an end marker indicating that the U-plane data is the last data at a predetermined timing, and
 the U-plane processing unit switches a transfer destination of the U-plane data, received from the serving gateway apparatus, from the source base station to the target base station at a timing immediately after the end marker is inserted.

A first wireless communication system of the present invention is a wireless communication system comprising a mobility management apparatus, a serving gateway apparatus, base stations, a mobile station, and a base station gateway apparatus that is connected to the mobility management apparatus, the serving gateway apparatus and subordinate base stations and that controls the subordinate base stations, wherein
 when the mobile station performs handover from a subordinate source base station to a subordinate target base station, the base station gateway apparatus terminates S1AP signaling received from the source base station and the target base station without relaying the S1AP signaling to the mobility management apparatus,
 the base station gateway apparatus inserts, into U-plane data received from the serving gateway apparatus and to be transferred to the source base station, an end marker indicating that the U-plane data is the last data at a predetermined timing, and
 the base station gateway apparatus switches a transfer destination of the U-plane data, received from the serving gateway apparatus, from the source base station to the target base station at a timing immediately after the end marker is inserted.

A second wireless communication system of the present invention is a wireless communication system comprising a mobility management apparatus, a serving gateway apparatus, base stations, a mobile station, and a base station gateway apparatus that is connected to the mobility management apparatus, the serving gateway apparatus and subordinate base stations and that controls the subordinate base stations, wherein
 when the mobile station performs handover from a subordinate source base station to a subordinate target base station, the base station gateway apparatus relays S1AP signaling received from the source base station and the target base station to the mobility management apparatus without terminating the S1AP signaling,
 the base station gateway apparatus inserts, into U-plane data received from the serving gateway apparatus and to be transferred to the source base station, an end marker indicating that the U-plane data is the last data at a predetermined timing; and
 the base station gateway apparatus switches a transfer destination of the U-plane data, received from the serving gateway apparatus, from the source base station to the target base station at a timing immediately after the end marker is inserted.

A first communication method of the present invention is a communication method by a base station gateway apparatus that is connected to a mobility management apparatus, a serving gateway apparatus and subordinate base stations and that controls the subordinate base stations, the method comprising the steps of:
 when a mobile station performs handover from a subordinate source base station to a subordinate target base station, terminating S1AP signaling received from the source base station and the target base station without relaying the S1AP signaling to the mobility management apparatus;

inserting, into U-plane data received from the serving gateway apparatus and to be transferred to the source base station, an end marker indicating that the U-plane data is the last data at a predetermined timing; and switching a transfer destination of the U-plane data received, from the serving gateway apparatus, from the source base station to the target base station at a timing immediately after the end marker is inserted.

A second communication method of the present invention is a communication method by a base station gateway apparatus that is connected to a mobility management apparatus, a serving gateway apparatus and subordinate base stations and that controls the subordinate base stations, the method comprising the steps of:

when a mobile station performs handover from a subordinate source base station to a subordinate target base station, relaying S1AP signaling received from the source base station and the target base station to the mobility management apparatus without terminating the S1AP signaling;

inserting, into U-plane data received from the serving gateway apparatus and to be transferred to the source base station, an end marker indicating that the U-plane data is the last data at a predetermined timing; and switching a transfer destination of the U-plane data, received from the serving gateway apparatus, from the source base station to the target base station at a timing immediately after the end marker is inserted.

Advantageous Effects of Invention

According to the present invention, advantageous effects can be obtained such as that a network load and a processing load of MME can be reduced.

DESCRIPTION OF EMBODIMENTS

Exemplary embodiments for practicing the present invention will be described below with reference to drawings.

(1) First Exemplary Embodiment

The present exemplary embodiment specifies procedures for an S1AP signaling process and an End Marker process in the case where HeNBGW terminates S1AP signaling without relaying the S1AP signaling to MME in Intra HeNBGW Inter HeNB S1 based Handover.

(1-1) Configuration of First Exemplary Embodiment

Figure 1:
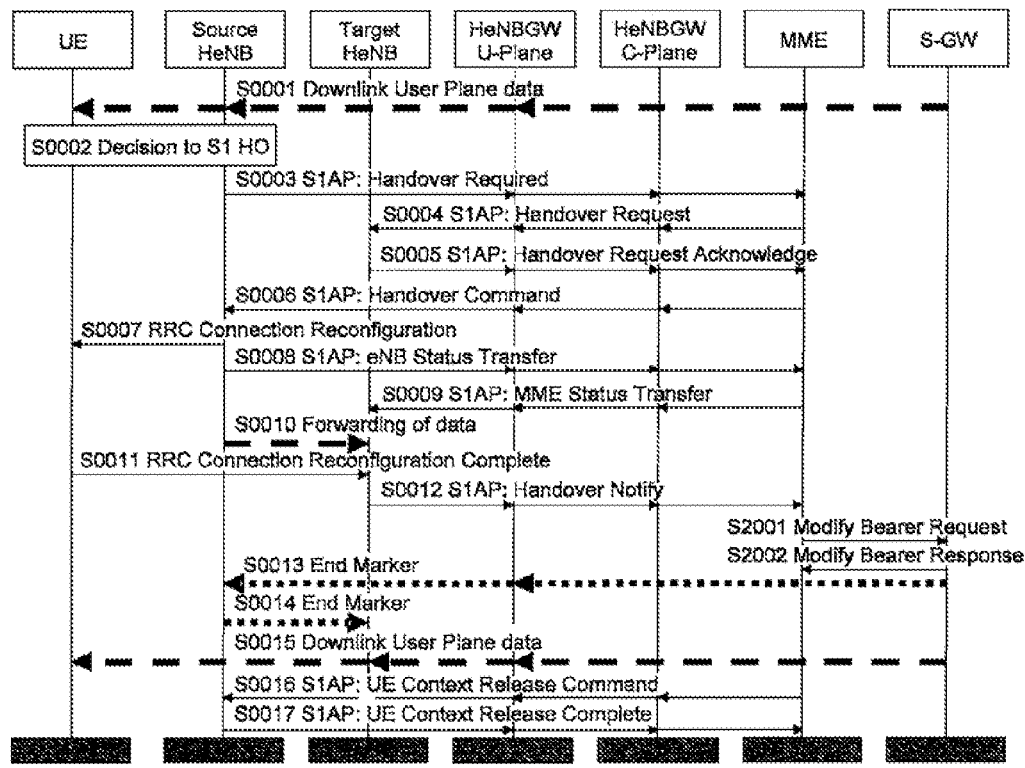
FIG. 1 is a sequence diagram illustrating an operation example 1 of a related wireless communication system.
Figure 2:
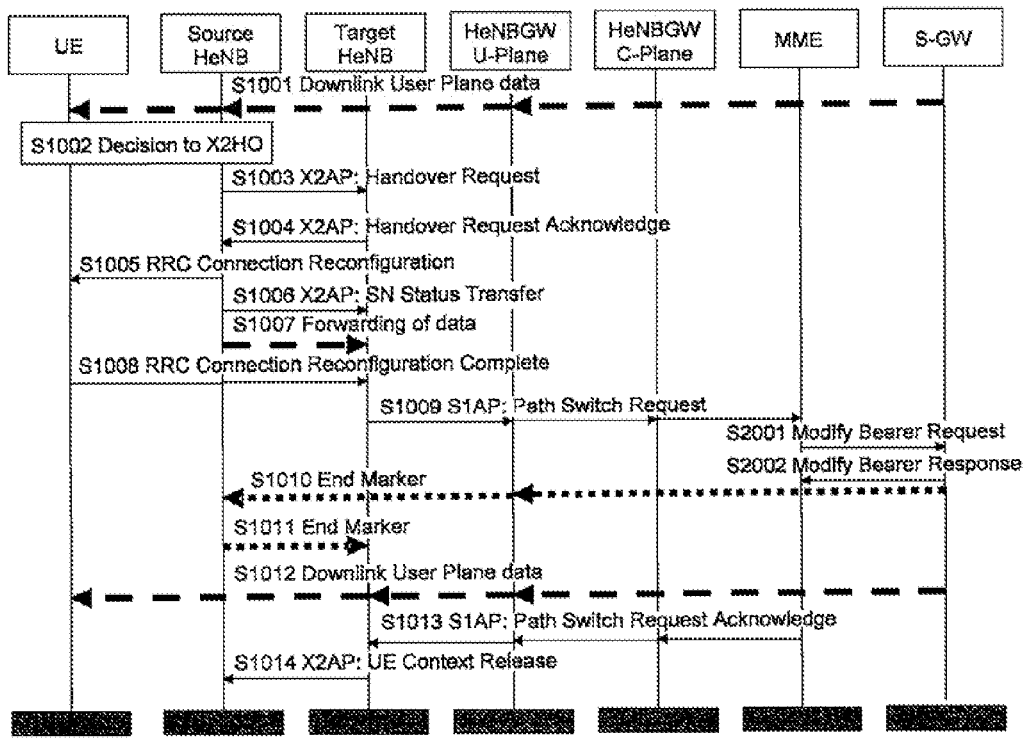
FIG. 2 is a sequence diagram illustrating an operation example 2 of the related wireless communication system.
Figure 3:
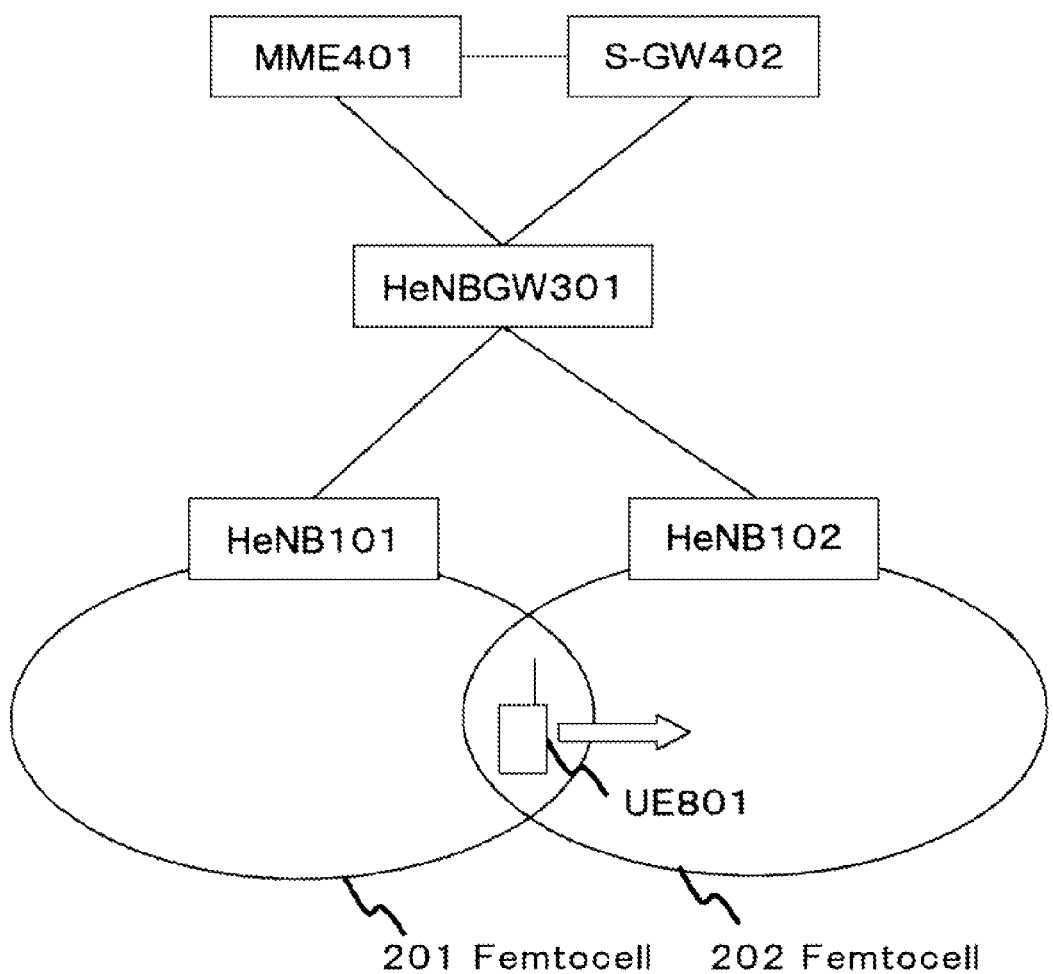
FIG. 3 is a diagram showing a configuration of a wireless communication system of a first exemplary embodiment.

FIG. 3 shows a configuration of a wireless communication system of the present exemplary embodiment.

As shown in FIG. 3, the wireless communication system of the present exemplary embodiment is an LTE system having HeNB 101 that constitutes femtocell 201, HeNB 102 that constitutes femtocell 202, HeNBGW 301, MME 401, S-GW 402 and UE 801. In the present exemplary embodiment, an X2 interface between HeNB 101 and HeNB 102 is not present.

MME 401 is a mobility management apparatus that processes a C-plane.

S-GW 402 is a serving gateway apparatus that processes a U-plane.

HeNBs 101 and 102 are base stations that perform wireless communication with UE 801.

HeNBGW 301 is a base station gateway apparatus that controls HeNBs 101 and 102.

HeNBGW 301 is connected to each of HeNB 101, HeNB 102, MME 401 and S-GW 402 via an S1 interface.

UE 801 is a mobile terminal and performs Intra HeNBGW Inter HeNB Handover for moving, for example, from femtocell 201 constituted by HeNB 101 to femtocell 202 constituted by HeNB 102.

In the present exemplary embodiment, when Intra HeNBGW Inter HeNB Handover is performed, S1 Based Handover is performed with the use of the S1 interfaces between HeNBs 101, 102 and HeNBGW 301 and between HeNBGW 301 and MME 401/S-GW 402 because an X2 interface between HeNB 101 and HeNB 102 is not present.

Figure 4:
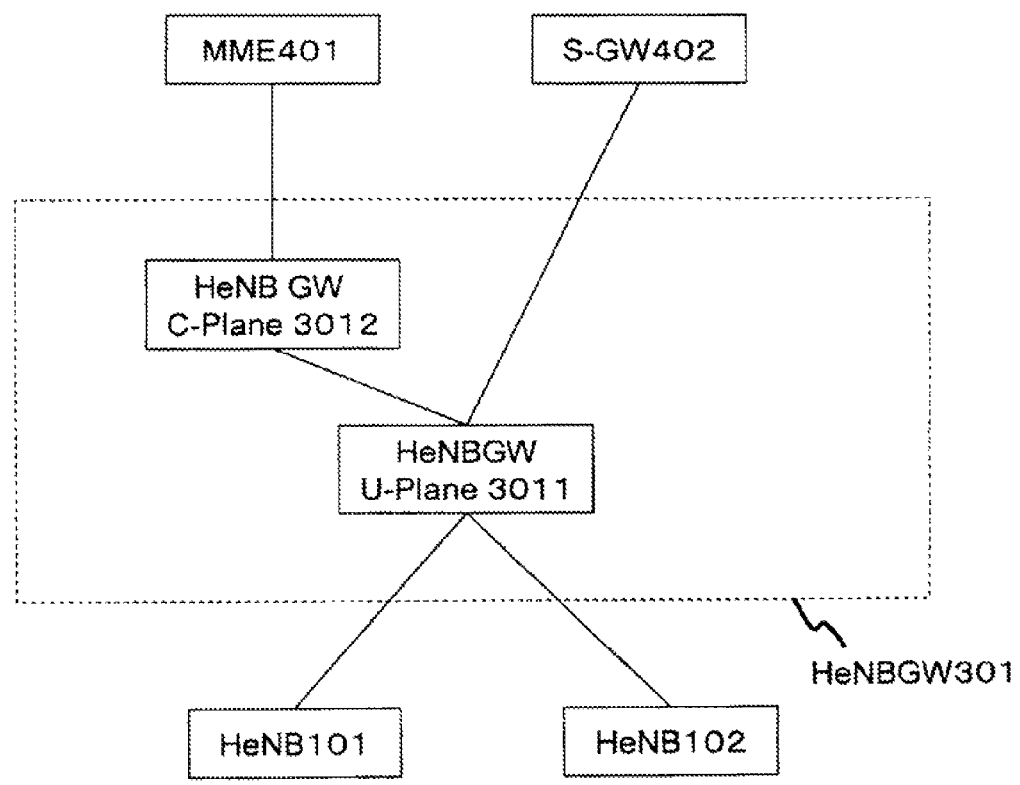
FIG. 4 is a diagram showing a configuration of HeNBGW shown in FIG. 3.

FIG. 4 shows a detailed configuration of HeNBGW 301 shown in FIG. 3.

As shown in FIG. 4, HeNBGW 301 has HeNBGW U-Plane 3011 and HeNBGW C-Plane 3012.

HeNBGW U-Plane 3011 is a U-plane processing unit that performs communication with S-GW 402 as well as performing communication with HeNBs 101 and 102.

HeNBGW C-Plane 3012 is a C-plane processing unit that performs communication with MME 401.

HeNBGW U-Plane 3011 and HeNBGW C-Plane 3012 are mutually connected.

HeNBGW U-Plane 3011 not only controls GTU-U but also operates as a control node of TNL (Transport Network Layer). For example, it is assumed that HeNBGW U-Plane 3011 can be provided with a security gateway function and can also establish an IP Sec tunnel in a network between HeNBs 101, 102 and HeNBGW 301.

U-Plane data is transmitted and received between S-GW 402 and HeNBs 101 and 102 via HeNBGW U-Plane 3011.

C-plane S1AP signaling is transmitted and received between MME 401 and HeNBs 101 and 102 via HeNBGW U-Plane 3011 and HeNBGW C-Plane 3012.

Especially, HeNBGW C-Plane 3012 is assumed to be able to terminate S1AP signaling without relaying it to MME 401. S1AP signaling between MME 401 and HeNBGW C-Plane 3012 is terminated and edited by HeNBGW C-Plane 3012 and then replaced with S1AP signaling between HeNBGW C-Plane 3012 and HeNBs 101 and 102, and vice versa.

(1-2) Operation of First Exemplary Embodiment

Figure 5:
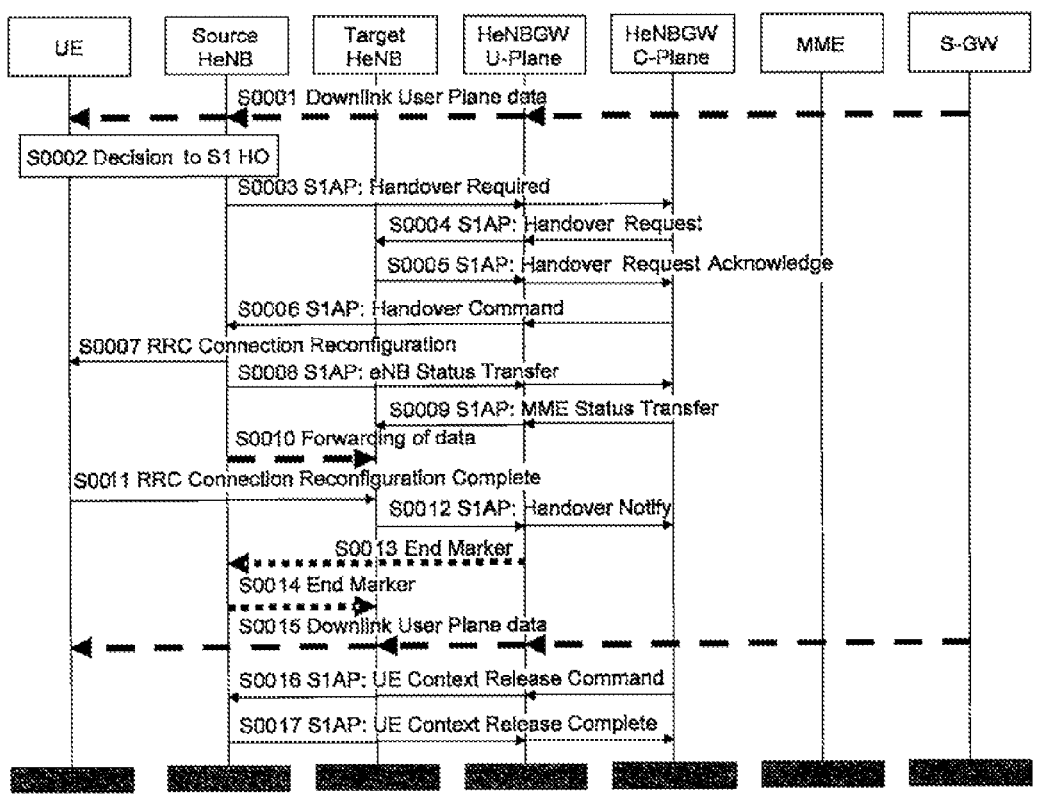
FIG. 5 is a sequence diagram illustrating an operation of the wireless communication system of the first exemplary embodiment.

An operation in the Intra HeNBGW Inter HeNB S1 Based Handover in the wireless communication system of the present exemplary embodiment will be described with reference to FIG. 5. Here, it is assumed that HeNB 101 is a Source HeNB (source base station), and HeNB 102 is a Target HeNB (target base station) (the same applies to the exemplary embodiments below).

(S0001) First, Downlink User Plane Data is transmitted to Source HeNB 101 from S-GW 402 via HeNBGW U-Plane 3011 and further transmitted to UE 801.

(S0002) Source HeNB 101 decides to perform S1 based Handover when UE 801 moves to Target HeNB 102. The details of the logic of deciding S1HO/X2HO in Source HeNB 101 will not be described here because the decision is a general technique known to LTE system engineers. For example, not X2 Based Handover but S1 Based Handover is performed irrespective of presence/absence of HeNBGW 301 unless an X2 interface between HeNBs is present.

(S0003) Source HeNB 101 transmits an S1AP: Handover Required message to HeNBGW C-Plane 3012 in order to request movement of UE 801 to Target HeNB 102. At subsequent steps including S0003, messages between HeNBs 101, 102 and HeNBGW 301, as well as C/U-plane messages, pass through HeNBGW U-Plane 3011. In general, however, the messages between HeNBs 101, 102 and HeNBGW 301 commonly pass through the same route because network security is ensured by IP Sec. If an IP Sec tunnel is not established between HeNBs 101, 102 and HeNBGW 301, messages is not required to pass through HeNBGW U-Plane 3011. The description will be continued on the assumption that messages is passed through HeNBGW U-Plane 3011 in order to switch the GTP tunnel at S0012.

(S0004) HeNBGW C-Plane 3012 finds out that Target HeNB 102 is a HeNB under the same HeNBGW 301 based on the S1AP: Handover Required message received at S0003, and HeNBGW C-Plane 3012 generates a Handover Request message itself. That is, HeNBGW 301 transmits the S1AP: Handover Request message to Target HeNB 102 in response without transferring the S1AP: Handover Required message to MME 401. Here, an E-RAB Parameter, which is a mandatory parameter, Security Context (Next Hop Chaining Count [hereinafter referred to as an NCC] and a Security Key) and the like are set in the S1AP: Handover Request message. As for these settings, values acquired from MME 401 when UE 801 connects to HeNBGW 301 for the first time are stored in a storage unit (not shown), and the values are reused for the settings. That is, according to FIG. 19.2.2.3-1 in Non-Patent Literature 1 (TS36.300 version 10.5.0), when HeNBGW 301 is connected to UE 801 for the first time by sending or receiving the call by UE 801, Security Context is generated with NCC=0 all the time, with the use of the E-RAB Parameter and the Security Key set in an S1AP: Initial Context Setup Request message. Furthermore, according to FIG. 19.2.2.5.2-1 in Non-Patent Literature 1 (TS36.300 version 10.5.0), when HeNBGW 301 is connected to UE 801 for the first time by movement of UE 801, the E-RAB Parameter and Security Context (an NCC and a Security Key) in an S1AP: Handover Request message are immediately used as they are.

HeNBGW C-Plane 3012 sets Source to Target Transparent Container in the S1AP: Handover Required message received at S0003 for the S1AP: Handover Request message transmitted at S0004 in response.

Since change or addition is made to the E-RAB Parameter and the Security Context by other S1AP signaling, HeNBGW C-Plane 3012 appropriately stores the E-RAB Parameter and the Security Context into the storage unit (not shown) to use them to generate a Handover Request message at S0004.

(S0005) Target HeNB 102 returns an S1AP: Handover Request Acknowledge message to HeNBGW C-Plane 3012 as a response to the S1AP: Handover Request message received at S0004. Here, Target HeNB 102 performs Resource Allocation for accepting handover and performs construction of Transparent Container for an RRC Connection Reconfiguration message transmitted at S0007 later, and the like. Since these are general techniques known to LTE system engineers, the details thereof will not be described.

(S0006) HeNBGW C-Plane 3012 generates a Handover Command message itself and transmits an S1AP: Handover Command message to Source HeNB 101 in response, without transferring the S1AP: Handover Request Acknowledge message received at S0005 to MME 401.

(S0007) When receiving the S1AP: Handover Command message at S0006, Source HeNB 101 transmits an RRC Connection Reconfiguration message to UE 801.

(S0008) Source HeNB 101 transmits an S1AP: eNB Status Transfer message to HeNBGW C-Plane 3012 in order to transfer Transparent Container to Target HeNB 102.

(S0009) HeNBGW C-Plane 3012 replaces the S1AP: eNB Status Transfer message received at S0008 with an S1AP: MME Status Transfer message and transmits it to Target HeNB 102, without transferring the S1AP: eNB Status Transfer message received at S0008 to MME 401.

(S0010) Source HeNB 101 does not transmit Downlink User Plane Data already received from S-GW 402 via HeNBGW U-Plane 3011 to UE 801 but starts Data Forwarding for forwarding the data to Target HeNB 102.

(S0011) When having successfully moved between HeNBs 101 and 102, UE 801 transmits an RRC Connection Reconfiguration Complete message to Target HeNB 102.

(S0012) When receiving the RRC Connection Reconfiguration Complete message at S0011, Target HeNB 102 transmits an S1AP: Handover Notify message to HeNBGW C-Plane 3012 via HeNBGW U-Plane 3011 in order to notify completion of the handover.

(S0013) HeNBGW U-Plane 3011 that has relayed the S1AP: Handover Notify message at S0012 transmits Downlink User Plane Data in which an End Marker is inserted, to Source HeNB 101 at the timing of receiving this message. Then HeNBGW U-Plane 3011 does not transmit Downlink User Plane Data to Source HeNB 101.

(S0014) In Data Forwarding which has been started at S0010, Source HeNB 101 transmits the End Marker received at S0014 to Target HeNB 102, the End Marker being included in the Downlink User Plane Data. Target HeNB 102 detects, by the End Marker, that the data is the end of the Downlink User Plane Data which has been received from Source HeNB 101 at and after S0010. Then Target HeNB 102 ensures the order of transfer of Downlink User Plane Data to UE 801 so that Downlink User Plane Data received directly from HeNBGW U-Plane 3011 is transferred to UE 801.

(S0015) Immediately after relaying the S1AP: Handover Notify message at S0012 and inserting an End Marker at S0013, HeNBGW U-Plane 3011 switches the transfer destination of Downlink User Plane Data received from S-GW 402 to Target HeNB 102.

Though HeNBGW U-Plane 3011 judges the timing of switching of the GTP tunnel by reading the S1AP: Handover Notify message of S0012 itself at S0013 and S0015, this is not limiting. HeNBGW C-Plane 3012 may receive the S1AP: Handover Notify message at S0012 and instruct HeNBGW U-Plane 3011 to perform switching of the GTP tunnel. In this case, the switching instruction is given in accordance with an interface between the C/U-planes (an H.248, GTP-C protocol or an independent protocol). Especially, as described at S0003, if an S1AP signaling message does not pass through HeNBGW U-Plane 3011, the interface between the C/U-planes is used, and HeNBGW C-Plane 3012 instructs HeNBGW U-Plane 3011 to switch the GTP tunnel for Downlink User Plane Data between Source HeNB 101 and Target HeNB 102.

(S0016) In order to complete handover, HeNBGW C-Plane 3012 generates an S1AP: UE Context Release Command message itself and transmits it to Source HeNB 101 for the purpose of releasing resources in Source HeNB 101.

(S0017) Source HeNB 101 returns an S1AP: UE Context Release Complete message to HeNBGW C-Plane 3012 as a response to the S1AP: UE Context Release Command message received at S0016. Now, HeNBGW C-Plane 3012 has completed the handover process.

(1-3) Advantageous Effects of First Exemplary Embodiment (1-3-1) In the present exemplary embodiment, HeNBGW 301 terminates S1AP signaling of S0003 to S0006, S0008, S0009, S0012, S0016 and S0017 without relaying the S1AP signaling to MME 401 and performs a process for a handover procedure (transmission of an S1AP: Handover Request message, an S1AP: Handover Command message, an MME Status Transfer message and an S1AP: UE Context Release Command message, and insertion of an End Marker) in the Intra HeNBGW Inter HeNB S1 based Handover.

Thus, since S1AP signaling is not communicated between MME 401 and HeNBGW C-Plane 3012 in the Intra HeNBGW Inter HeNB S1 based Handover, an advantage can be obtained in which the load of network resources between MME 401 and HeNBGW 301, and the processing load of MME 401 can be reduced.

(1-3-2) Furthermore, in the present exemplary embodiment, HeNBGW 301 can judged that S0003 and S0004 are for C-plane S1AP signaling for the same UE in the Intra HeNBGW Inter HeNB S1 based Handover. Therefore, an advantage can be obtained in which it is possible to avoid the network resources between MME 401 and HeNBGW 301 from being doubly secured.

(1-3-3) Furthermore, in the present exemplary embodiment, HeNBGW 301 stores a Security Key and an NCC at the time of connecting of UE 801 to HeNBGW 301 for the first time in the storage unit (not shown) and transmits an S1AP: Handover Request message reusing the Security Key and the NCC at S0004, in the Intra HeNBGW Inter HeNB S1 based Handover. Therefore, an advantage can be obtained in which a secure network can be maintained.

(1-3-4) Furthermore, in the present exemplary embodiment, HeNBGW 301 can insert an End Marker into Downlink User Plane Data at S0013 and switch the GTP tunnel between Source HeNB 101 and Target HeNB 102 at the timing of inserting the End Marker. Therefore, an advantage can be obtained in which the order of transfer of Downlink User Plane Data at Target HeNB 102 can be ensured.

(2) Second Exemplary Embodiment

The present exemplary embodiment specifies procedures for an S1AP signaling process and an End Marker process in the case where HeNBGW terminates S1AP signaling without relaying the S1AP signaling to MME in Intra HeNBGW Inter HeNB X2 based Handover.

(2-1) Configuration of Second Exemplary Embodiment

Figure 6:
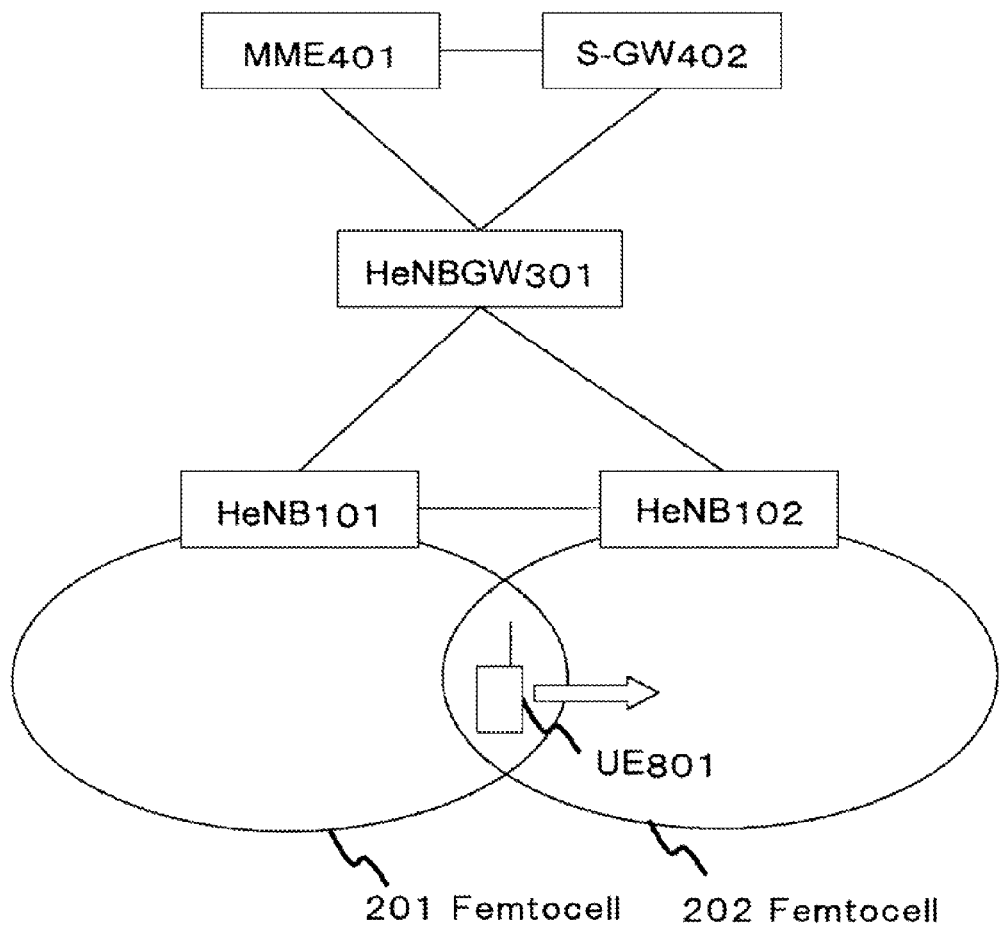
FIG. 6 is a diagram showing a configuration of a wireless communication system of a second exemplary embodiment.

FIG. 6 shows a configuration of a wireless communication system of the present exemplary embodiment.

As shown in FIG. 6, the basic configuration of the wireless communication system of the present exemplary embodiment is similar to that of the first exemplary embodiment in FIG. 3 but is different in that an X2 interface is present between Source HeNB 101 and Target HeNB 102.

Therefore, when Intra HeNBGW Inter HeNB Handover is performed in the present exemplary embodiment, X2 Based Handover is performed with the use of the X2 interface between HeNB 101 and HeNB 102.

The detailed configuration of HeNBGW 301 is just the same as that in FIG. 4.

(2-2) Operation of Second Exemplary Embodiment

Figure 7:
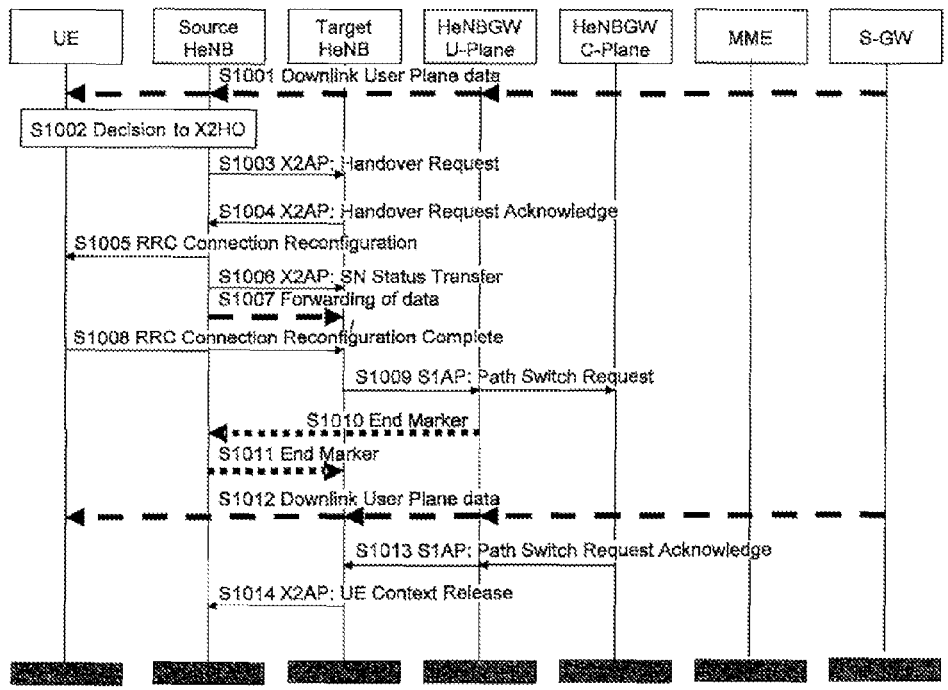
FIG. 7 is a sequence diagram illustrating an operation of the wireless communication system of the second exemplary embodiment.

An operation in the Intra HeNBGW Inter HeNB X2 based Handover in the wireless communication system of the present exemplary embodiment will be described with reference to FIG. 7.

(S1001) First, Downlink User Plane Data is transmitted to Source HeNB 101 from S-GW 402 via HeNBGW U-Plane 3011 and further transmitted to UE 801.

(S1002) Source HeNB 101 decides to perform X2 based Handover when UE 801 moves to Target HeNB 102. The details of the logic of deciding S1HO/X2HO in Source HeNB 101 will not be described here because the decision is a general technique known to LTE system engineers. For example, not S1 Based Handover but X2 Based Handover is performed irrespective of presence/absence of HeNBGW 301 if an X2 interface between HeNBs is present, and HeNBs are upper-connected to the same MME 401.

(S1003) Source HeNB 101 transmits an X2AP: Handover Request message to Target HeNB 102 in order to request movement of UE 801 to Target HeNB 102.

(S1004) Target HeNB 102 returns an X2AP: Handover Request Acknowledge message to Source HeNB 101 as a response to the X2AP: Handover Request message received at S1003. Here, Target HeNB 102 performs Resource Allocation for accepting handover and performs construction of Transparent Container for an RRC Connection Reconfiguration message transmitted at S1005 later, and the like. Since these are general techniques known to LTE system engineers, the details thereof will not be described.

(S1005) When receiving the X2AP: Handover Request Acknowledge message at S1004, Source HeNB 101 transmits an RRC Connection Reconfiguration message to UE 801.

(S1006) Source HeNB 101 transmits an X2AP: SN Status Transfer message to Target HeNB 102 in order to transfer Transparent Container to Target HeNB 102.

(S1007) Source HeNB 101 does not transmit Downlink User Plane Data, already received from S-GW 402 via HeNBGW U-Plane 3011, to UE 801 but starts Data Forwarding for forwarding the data to Target HeNB 102.

(S1008) When having successfully moved between HeNBs 101 and 102, UE 801 transmits an RRC Connection Reconfiguration Complete message to Target HeNB 102.

(S1009) Target HeNB 102 transmits am S1AP: Path Switch Request message to HeNBGW C-Plane 3012 in order to request completion of the handover and in order to switch the GTP tunnel to an upper node. Here, the messages between Target HeNB 102 and HeNBGW 301 at S1009 and S1013 later, as well as C/U-plane messages, pass through HeNBGW U-Plane 3011. In general, however, the messages between HeNBs 101, 102 and HeNBGW 301 commonly pass through the same route because network security is ensured by IP Sec. Though messages is not required to pass through HeNBGW U-Plane 3011, the description will be continued on the assumption that messages is passed through HeNBGW U-Plane 3011 in order to switch the GTP tunnel at S1010.

(S1010) HeNBGW U-Plane 3011 that has relayed the S1AP: Path Switch Request message at S1009 transmits Downlink User Plane Data in which an End Marker is inserted, to Source HeNB 101 at the timing of receiving this message. Then HeNBGW U-Plane 3011 does not transmit Downlink User Plane Data to Source HeNB 101.

(S1011) In Data Forwarding which has been started at S1007, Source HeNB 101 transmits the Downlink User Plane Data with the End Marker inserted therein, which was received at S1011, to Target HeNB 102. Target HeNB 102 detects, by the End Marker, that the data is the end of the Downlink Data which has been received from Source HeNB 101 at and after S1007. Then Target HeNB 102 ensures the order of transfer of Downlink Data to UE 801 so that Downlink Data received directly from HeNBGW U-Plane 3011 is transferred to UE 801.

(S1012) Immediately after relaying the Path Switch Request at S1009 and inserting the End Marker at S1010, HeNBGW U-Plane 3011 switches the transfer destination of Downlink User Plane Data received from S-GW 402 to Target HeNB 102.

Here, though HeNBGW U-Plane 3011 judges the timing of switching of the GTP tunnel by reading the S1AP: Path Switch Request message of S1009 itself, this is not limiting. HeNBGW C-Plane 3012 may receive the S1AP: Path Switch Request message at S1009 and instruct HeNBGW U-Plane 3011 to perform switching of the GTP tunnel. This point is similar to S0015 in the first exemplary embodiment.

(S1013) HeNBGW C-Plane 3012 finds out that Source HeNB 101 is a HeNB under the same HeNBGW 301 based on the S1AP: Path Switch Request message received at S1009. Therefore, HeNBGW C-Plane 3012 transmits an S1AP: Path Switch Request Acknowledge message to Target HeNB 102 in response without transferring this S1AP: Path Switch Request message to MME 401. Here, Security Context (an NCC and a Security Key), which is mandatory parameters, is set in the S1AP: Path Switch Request Acknowledge message. As for this setting, a Security Key and an NCC at the time when UE 801 connects to HeNBGW 301 for the first time are stored in the storage unit (not shown), and they are reused for the setting. This point is similar to S0004 in the first exemplary embodiment.

(S1014) In order to complete handover, Target HeNB 102 transmits an X2AP: UE Context Release message to Source HeNB 101 for the purpose of releasing resources in Source HeNB 101.

(2-3) Advantageous Effects of Second Exemplary Embodiment (2-3-1) In the present exemplary embodiment, HeNBGW 301 terminates S1AP signaling of S1009 and S1013 without relaying the S1AP signaling to MME 401 and performs a process for a handover procedure (transmission of an S1AP: Path Switch Request Acknowledge message and insertion of an End Marker) in the Intra HeNBGW Inter HeNB X2 based Handover.

Thus, since S1AP signaling is not communicated between MME 401 and HeNBGW C-Plane 3012 in the Intra HeNBGW Inter HeNB X2 based Handover, an advantage can be obtained in which the load of network resources between MME 401 and HeNBGW 301, and the processing load of MME 401 can be reduced.

(2-3-2) Furthermore, in the present exemplary embodiment, since it is not necessary to secure network resources for Source HeNB between HeNBGW U-Plane and MME and network resources for Target HeNB separately in the Intra HeNBGW Inter HeNB X2 based Handover, an advantage can be obtained in which resources can be reduced.

(2-3-3) Furthermore, in the present exemplary embodiment, HeNBGW 301 stores a Security Key and an NCC at the time of UE 801 connecting to HeNBGW 301 for the first time in the storage unit (not shown) and transmits an S1AP: Path Switch Request Acknowledge message reusing the Security Key and the NCC at S1013, in the Intra HeNBGW Inter HeNB X2 based Handover. Therefore, an advantage can be obtained in which a secure network can be maintained.

(2-3-4) Furthermore, in the present exemplary embodiment, HeNBGW 301 can insert an End Marker into Downlink User Plane Data at S1010 and switch the GTP tunnel between Source HeNB 101 and Target HeNB 102 at the timing of inserting the End Marker. Therefore, an advantage can be obtained in which the order of transfer of Downlink User Plane Data at Target HeNB 102 can be ensured.

(2-3-5) Furthermore, in the present exemplary embodiment, HeNBGW 301 can insert an End Marker and switch the GTP tunnel between Source HeNB 101 and Target HeNB 102 at the time of recognizing at S1009 that the handover has succeeded. Therefore, an advantage can be obtained in which switching of the GTP tunnel can be performed at a good timing so that it is possible to avoid putting pressure on both of network resources from HeNBGW U-Plane 3011 to Source HeNB 101 and network resources from Source HeNB 101 to Target HeNB 102.

(3) Third Exemplary Embodiment

The present exemplary embodiment specifies procedures for an S1AP signaling process and an End Marker process in the case where HeNBGW relays S1AP signaling to MME without terminating the S1AP signaling in Intra HeNBGW Inter HeNB S1 based Handover.

(3-1) Configuration of Third Exemplary Embodiment

The configuration of a wireless communication system of the present exemplary embodiment is similar to those in FIGS. 3 and 4.

(3-2) Operation of Third Exemplary Embodiment

Figure 8:
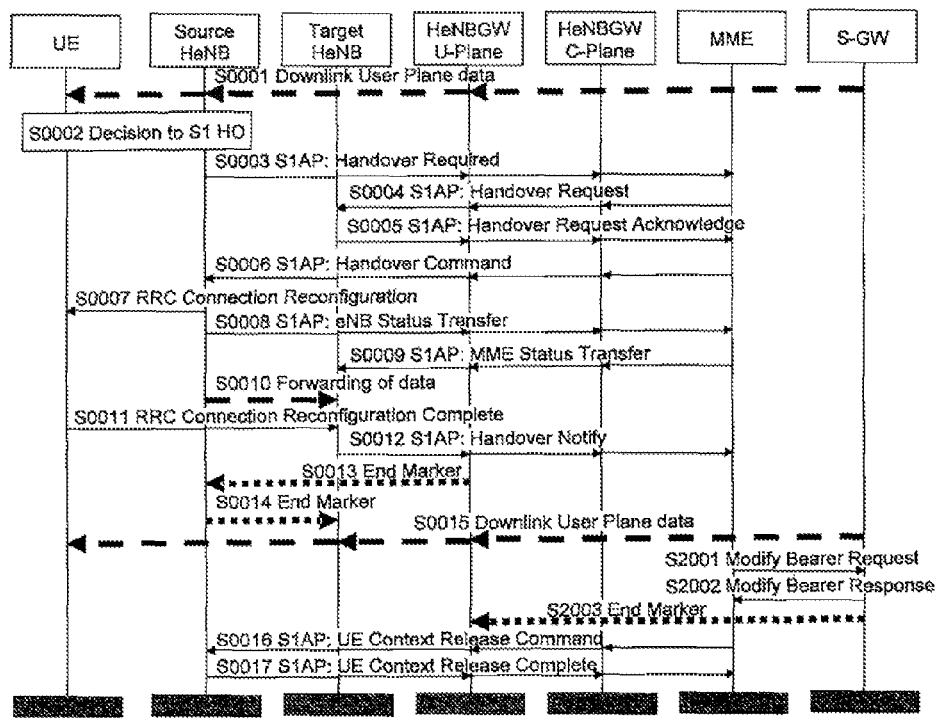
FIG. 8 is a sequence diagram illustrating an operation of a wireless communication system of a third exemplary embodiment.

An operation in the Intra HeNBGW Inter HeNB S1 Based Handover in the wireless communication system of the present exemplary embodiment will be described with reference to FIG. 8. Description will be made below only on steps that are different from the first exemplary embodiment, and it is assumed that the very same description is applied to the other steps for which the same reference numerals as those of the first exemplary embodiment are used.

(S0003) Source HeNB 101 transmits an S1AP: Handover Required message to HeNBGW C-Plane 3012 in order to request movement of UE 801 to Target HeNB 102. HeNBGW C-Plane 3012 transfers this S1AP: Handover Required message to MME 401.

(S0004) MME 401 finds out that Target HeNB 102 is a HeNB under the same HeNBGW 301 based on the S1AP: Handover Required message received at S0003, and MME 401 transmits an S1AP: Handover Request message to HeNBGW 301 that controls Target HeNB 102, in response. Meanwhile, HeNBGW 301 predicts and judges that UE 801, for which the S1AP: Handover Request message of S0004 is destined, is the same as UE 801, for which the S1AP: Handover Required message of S0003 is destined, from various parameters such as an E-RABs To Be Setup List and Source to Target Transparent Container. This prediction/judgment may be performed by HeNBGW U-Plane 3011 or HeNBGW C-Plane 3012.

(S0005) Target HeNB 102 returns an S1AP: Handover Request Acknowledge message to MME 401 via HeNBGW C-Plane 3012 as a response to the S1AP: Handover Request message received at S0003.

(S0006) When receiving the S1AP: Handover Request Acknowledge message at S1005, MME 401 transmits an S1AP: Handover Command message to Source HeNB 101 via the same HeNBGW 301.

(S0008) Source HeNB 101 transmits an S1AP: eNB Status Transfer message to MME 401 via HeNBGW C-Plane 3012 in order to transfer Transparent Container to Target HeNB 102.

(S0009) MME 401 replaces the S1AP: eNB Status Transfer message received at S0008 with an S1AP: MME Status Transfer message and transmits it to Target HeNB 102 via HeNBGW C-Plane 3012.

(S0015) Immediately after relaying the S1AP: Handover Notify message at S0012 and inserting an End Marker at S0013, HeNBGW U-Plane 3011 switches the transfer destination of Downlink User Plane Data, received from S-GW 402, to Target HeNB 102. Because having judged at S0004 that the messages of S0003 and S0004 are signaling for handover for the same UE 801, HeNBGW 301 can perform switching of the GTP tunnel.

The following S2001, S2002 and S2003 are performed in parallel with S0014 and S0015.

(S2001) When receiving the S1AP: Handover Notify message at S0012, MME 401 transmits a Modify Bearer Request message to S-GW 402 in order to switch the GTP tunnel between S-GW 402 and HeNBGW 301.

(S2002) S-GW 402 returns a Modify Bearer Response message to MME 401 as a response to the Modify Bearer Request message received at S2001.

(S2003) S-GW 402 inserts an End Marker into Downlink User Plane Data and transmits it to HeNBGW U-Plane 3011 in order to switch the GTP tunnel. However, HeNBGW U-Plane 3011 releases and discards the received End Marker.

(S0016) In order to complete the handover, MME 401 transmits an S1AP: UE Context Release Command message to Source HeNB 101 via HeNBGW C-Plane 3012 for the purpose of releasing resources in Source HeNB 101.

(S0017) Target HeNB 102 returns an S1AP: UE Context Release Complete message to MME 401 via HeNBGW C-Plane as a response to the S1AP: UE Context Release Command message received at S0016. Now, the handover process is completed.

(3-3) Advantageous Effects of Third Exemplary Embodiment (3-3-1) In the present exemplary embodiment, HeNBGW 301 performs a process of judging that UEs 801 for which Handover Required and for Handover Request messages are destined, respectively, are the same, at S0004. Therefore, an advantage can be obtained in which it is possible to realize switching of the GTP tunnel at S0015 as well as to avoid network resources between MME 401 and HeNBGW 301 from being doubly secured.

(3-3-2) Furthermore, in the present exemplary embodiment, HeNBGW 301 discards the End Marker transmitted from S-GW 402, at S2003. Therefore, an advantage can be obtained in which it is possible to ensure the order of transfer of Downlink User Plane Data of Target HeNB 102 at S0014 without being influenced by the End Marker transmitted from S-GW 402.

(3-3-3) Furthermore, in the present exemplary embodiment, HeNBGW 301 generates an End Marker at S0013. Therefore, an advantage can be obtained in which, even in the case where S-GW 402 does not transmit an End Marker at S2003, it is possible to ensure the order of transfer of Downlink User Plane Data of Target HeNB 102 at S0014. The above case possibly occurs if S-GW 402 is provided with such implementation that an End Marker is not to be transmitted, in a state that transmission destinations before and after handover are the same GTP tunnel of HeNBGW 301 when seen from S-GW 402 side.

(4) Fourth Exemplary Embodiment

The present exemplary embodiment specifies procedures for an S1AP signaling process and an End Marker process in the case where HeNBGW relays S1AP signaling to MME without terminating the S1AP signaling in Intra HeNBGW Inter HeNB X2 based Handover.

(4-1) Configuration of Fourth Exemplary Embodiment

The configuration of a wireless communication system of the present exemplary embodiment is similar to those in FIGS. 6 and 4.

(4-2) Operation of Fourth Exemplary Embodiment

Figure 9:
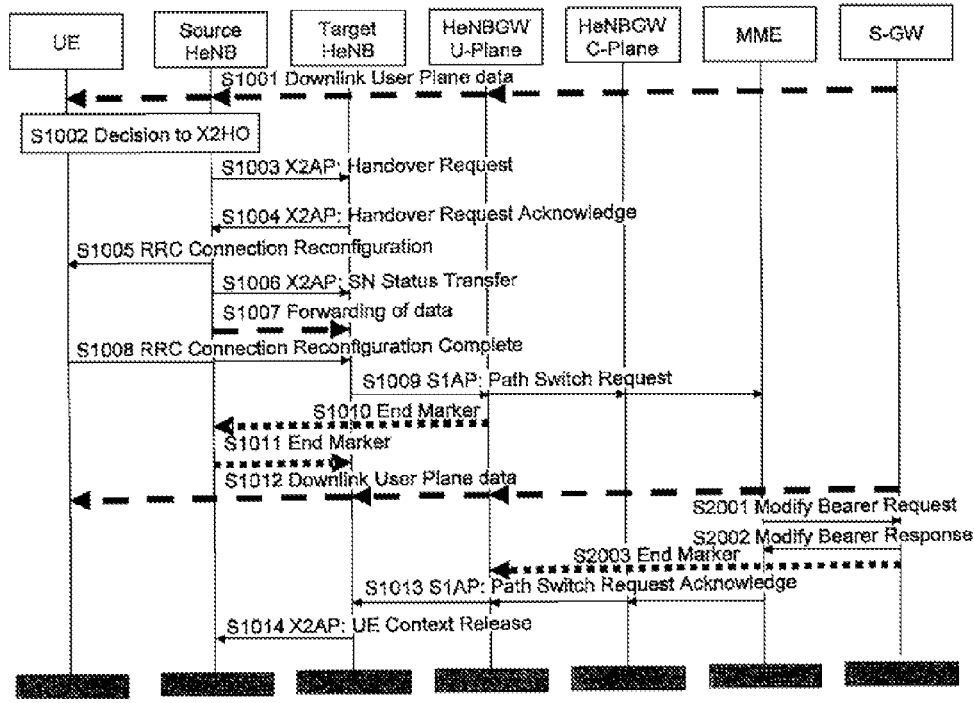
FIG. 9 is a sequence diagram illustrating an operation of a wireless communication system of a fourth exemplary embodiment.

An operation in the Intra HeNBGW Inter HeNB X2 Based Handover in the wireless communication system of the present exemplary embodiment will be described with reference to FIG. 9. Description will be made below only on steps that are different from the second exemplary embodiment, and it is assumed that the very same description is applied to the other steps for which the same reference numerals as those of the second exemplary embodiment are used.

(S1009) Target HeNB 102 transmits an S1AP: Path Switch Request message to MME 401 via HeNBGW C-Plane 3012 in order to request completion of the handover and in order to switch the GTP tunnel to an upper node.

(S1013) MME 401 finds out that Source HeNB 101 is a HeNB under the same HeNBGW 301 based on the S1AP: Path Switch Request message received at S1009, and MME 401 transmits an S1AP Path Switch Request Acknowledge message to Target HeNB 102 via HeNBGW 301 in response.

The following S2001, S2002 and S2003 are performed in parallel with S1011 and S1012.

(S2001) When receiving the S1AP: Path Switch Request message at S1009, MME 401 transmits a Modify Bearer Request message to S-GW 402 in order to switch the GTP tunnel between S-GW 402 and HeNBGW 301.

(S2002) S-GW 402 returns a Modify Bearer Response message to MME 401 as a response to the Modify Bearer Request message received at S2001.

(S2003) S-GW 402 inserts an End Marker into Downlink User Plane Data and transmits it to HeNBGW U-Plane 3011 in order to switch the GTP tunnel. However, HeNBGW U-Plane 3011 releases and discards the received End Marker.

(4-3) Advantageous Effects of Fourth Exemplary Embodiment (4-3-1) In the present exemplary embodiment, HeNBGW 301 can insert an End Marker into Downlink User Plane Data at S1010 and switch the GTP tunnel between Source HeNB 101 and Target HeNB 102 at the timing of inserting End Marker. Therefore, an advantage can be obtained in which the order of transfer of Downlink User Plane Data at Target HeNB 102 at S1012 can be ensured.

(4-3-4) Furthermore, in the present exemplary embodiment, HeNBGW 301 can insert an End Marker and switch the GTP tunnel between Source HeNB 101 and Target HeNB 102 at the time of recognizing at S1009 that the handover has succeeded. Therefore, an advantage can be obtained in which switching of the GTP tunnel can be performed at a good timing so that it is possible to avoid putting pressure on both of network resources from HeNBGW U-Plane 3011 to Source HeNB 101 and network resources from Source HeNB 101 to Target HeNB 102.

(4-3-5) Furthermore, in the present exemplary embodiment, HeNBGW 301 discards the End Marker transmitted from S-GW 402, at S2003. Therefore, an advantage can be obtained in which it is possible to ensure the order of transfer of Downlink User Plane Data of Target HeNB 102 at S1012 without being influenced by the End Marker transmitted from S-GW 402.

(4-3-6) Furthermore, in the present exemplary embodiment, HeNBGW 301 generates an End Marker at S1010. Therefore, an advantage can be obtained in which, even in the case where S-GW 402 does not transmit an End Marker at S2003, it is possible to ensure the order of transfer of Downlink User Plane Data of Target HeNB 102 at S1011. The above case possibly occurs if S-GW 402 is provided with such implementation that an End Marker is not to be transmitted, in a state that transmission destinations before and after handover are the same GTP tunnel of HeNBGW 301 when seen from S-GW 402 side.

(5) Fifth Exemplary Embodiment

The present exemplary embodiment specifies procedures for an S1AP signaling process and a route switching process based on detection of an End Marker in the case where HeNBGW relays S1AP signaling to MME without terminating the S1AP signaling in Intra HeNBGW Inter HeNB S1 based Handover.

(5-1) Configuration of Fifth Exemplary Embodiment

The configuration of a wireless communication system of the present exemplary embodiment is similar to those in FIGS. 3 and 4.

(5-2) Operation of Fifth Exemplary Embodiment

Figure 10:
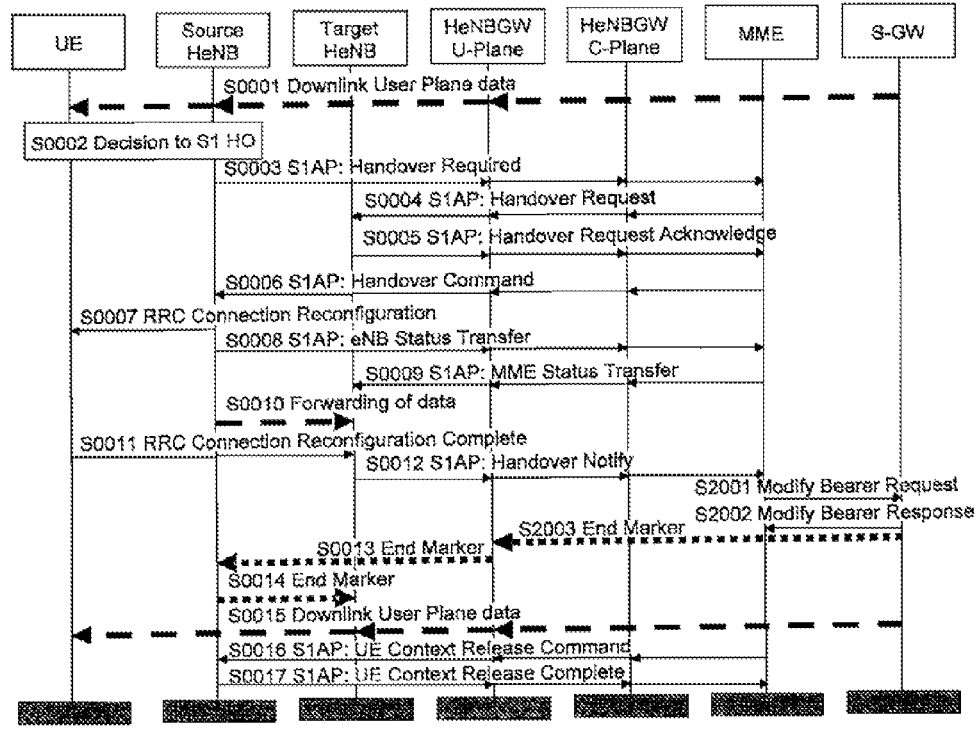
FIG. 10 is a sequence diagram illustrating an operation of a wireless communication system of a fifth exemplary embodiment.

An operation in intra HeNBGW the inter HeNB S1 Based Handover in the wireless communication system of the present exemplary embodiment will be described with reference to FIG. 10. Description will be made below only on steps that are different from the third exemplary embodiment, and it is assumed that the very same description is applied to the other steps for which the same reference numerals as those of the third exemplary embodiment are used.

(S2003) After returning the Modify Bearer Response message to MME 401 at S2002, S-GW 402 inserts an End Marker into Downlink User Plane Data and transmits it to HeNBGW U-Plane 3011 in order to switch the GTP tunnel. At the timing of receiving the End Marker from S-GW 402, HeNBGW U-Plane 3011 knows the timing of switching of the GTP tunnel of Target HeNB 102.

(S0013) HeNBGW U-Plane 3011 which has received the End Marker at S2003 transmits Downlink User Plane Data with the End Marker inserted therein to Source HeNB 101 at the timing of receiving this End Marker. Then HeNBGW U-Plane 3011 does not transmit Downlink User Plane Data to Source HeNB 101.

(S0014) In Data Forwarding which has been started at S0010, Source HeNB 101 transmits the Downlink User Plane Data with the End Marker inserted therein, which was received at S0014, to Target HeNB 102. Target HeNB 102 detects, by the End Marker, that the data is the last of the Downlink Data which has been received from Source HeNB 101 at and after S0010. Then Target HeNB 102 ensures the order of transfer of Downlink User Plane Data to UE 801 so that Downlink Data received directly from HeNBGW U-Plane 3011 is transferred to UE 801.

(S0015) Immediately after receiving the End Marker at S2003 and inserting End Marker at S0013, HeNBGW U-Plane 3011 switches the transfer destination of Downlink User Plane Data, received from S-GW 402, to Target HeNB 102. Because having judged at S0004 that the messages of S0003 and S0004 are S1AP signaling for handover for the same UE 801, HeNBGW 301 can perform switching of the GTP tunnel.

(5-3) Advantageous Effects of Fifth Exemplary Embodiment (5-3-1) In the present exemplary embodiment, HeNBGW 301 knows the timing of switching the transfer destination of Downlink User Plane Data received from S-GW 402 at S0015 to the GTP tunnel of Target HeNB 102 at the timing of receiving the End Marker at S2003. Therefore, transfer of Downlink User Plane Data with the End Marker inserted therein is realized by HeNBGW U-Plane 3011. Also, transfer of the Downlink User Plane Data around Downlink User Plane Data with the End Marker inserted therein is realized by HeNBGW U-Plane 3011. As a result, an advantage can be obtained in which the order of transfer of Downlink User Plane Data at S0014 can be ensured.

(6) Sixth Exemplary Embodiment

The present exemplary embodiment specifies procedures for an S1AP signaling process and a route switching process based on detection of an End Marker in the case where HeNBGW relays S1AP signaling to MME without terminating the S1AP signaling in Intra HeNBGW Inter HeNB X2 based Handover.

(6-1) Configuration of Sixth Exemplary Embodiment

The configuration of a wireless communication system of the present exemplary embodiment is similar to those in FIGS. 6 and 4.

(6-2) Operation of Sixth Exemplary Embodiment

Figure 11:
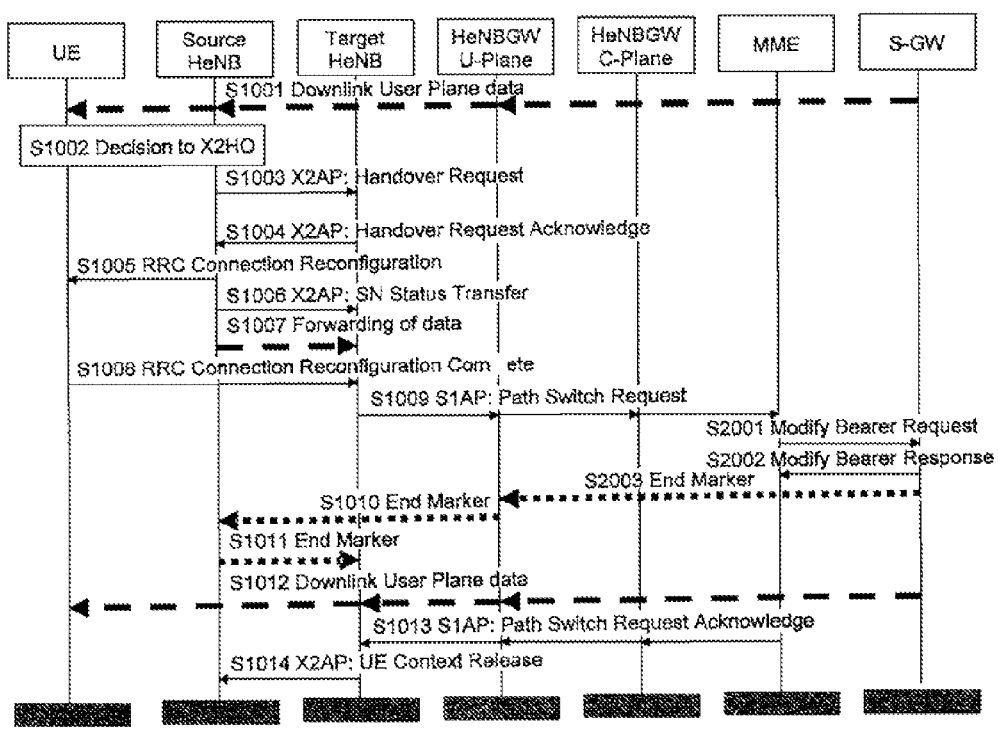
FIG. 11 is a sequence diagram illustrating an operation of a wireless communication system of a sixth exemplary embodiment.

An operation in the Intra HeNBGW Inter HeNB X2 Based Handover in the wireless communication system of the present exemplary embodiment will be described with reference to FIG. 11. Description will be made below on only steps that are different from the fourth exemplary embodiment, and it is assumed that the very same description is applied to the other steps for which the same reference numerals as those of the fourth exemplary embodiment are used.

(S1009) Target HeNB 102 transmits an S1AP: Path Switch Request message to HeNBGW C-Plane 3011 in order to request completion of the handover and in order to switch the GTP tunnel to an upper node.

(S2003) After returning the Modify Bearer Response message to MME 401 at S2002, S-GW 402 inserts an End Marker into Downlink User Plane Data and transmits it to HeNBGW U-Plane 3011 in order to switch the GTP tunnel. At the timing of receiving the End Marker from S-GW 402, HeNBGW U-Plane 3011 knows the timing of switching of the GTP tunnel of Target HeNB 102.

(S1010) HeNBGW U-Plane 3011 which has received the End Marker at S2003 transmits Downlink User Plane Data with the End Marker inserted therein to Source HeNB 101 at the timing of receiving this End Marker. Then HeNBGW U-Plane 3011 does not transmit Downlink User Plane Data to Source HeNB 101.

(S1012) Immediately after receiving the End Marker from S-GW 402 at S1010 and inserting the End Marker at S1010, HeNBGW U-Plane 3011 switches the transfer destination of Downlink User Plane Data, received from S-GW 402, to Target HeNB 102.

(6-3) Advantageous Effects of Sixth Exemplary Embodiment (6-3-1) In the present exemplary embodiment, HeNBGW 301 knows the timing of switching the transfer destination of Downlink User Plane Data received from S-GW 402 to the GTP tunnel of Target HeNB 102 at S1010 at the timing of receiving the End Marker at S2003. Therefore, transfer of Downlink User Plane Data with the End Marker inserted therein is realized by HeNBGW U-Plane 3011. Also, transfer of the Downlink User Plane Data around Downlink User Plane Data with the End Marker inserted therein is realized by HeNBGW U-Plane 3011. As a result, an advantage can be obtained in which the order of transfer of Downlink User Plane Data at S1011 can be ensured.

(7) Other Exemplary Embodiments

The present invention has been described with reference to the exemplary embodiments. The present invention, however, is not limited to the above exemplary embodiments. Various changes that can be understood by one skilled in the art can be made to the configurations and the details of the present invention.

For example, though an operation of HeNBGW 301 has been explained in the first to six exemplary embodiments, the same processes and advantageous effects are applicable to intra DeNB inter Relay eNB handover in the case where HeNBGW operates as DeNB and HeNB operates as Relay eNB, which is described in Section 4.7 of Non-Patent Literature 1 (TS36.300 v10.5.0).

A part or all of the above exemplary embodiments can be described as supplementary notes shown below but are not limited to the supplementary notes below.

(Supplementary Note 1)

A base station gateway apparatus that is connected to a mobility management apparatus, a serving gateway apparatus and subordinate base stations and that controls the subordinate base stations, the base station gateway apparatus comprising:
 a C-plane processing unit; and
 a U-plane processing unit; wherein
 when a mobile station performs handover from a subordinate source base station to a subordinate target base station, the C-plane processing unit terminates S1AP signaling received from the source base station and the target base station without relaying the S1AP signaling to the mobility management apparatus; and
 the U-plane processing unit inserts, into U-plane data that is received from the serving gateway apparatus and that is to be transferred to the source base station, an end marker indicating that the U-plane data is the last data at a predetermined timing, and
 the U-plane processing unit switches a transfer destination of the U-plane data, received from the serving gateway apparatus, from the source base station to the target base station at a timing immediately after the end marker is inserted.

(Supplementary Note 2)

The base station gateway apparatus according to supplementary note 1, further comprising a storage unit that stores a security key and an NCC acquired from the mobility management apparatus when the mobile station connects to the base station gateway apparatus for the first time; wherein
 the C-plane processing unit sets the security key and the NCC stored in the storage unit for S1AP signaling to be transmitted to the target base station.

(Supplementary Note 3)

The base station gateway apparatus according to supplementary note 1 or 2, wherein
 the handover is a handover using an S1 interface; and
 the U-plane processing unit inserts the end marker into the U-plane data at a timing of receiving an S1AP: Handover Notify message from the target base station.

(Supplementary Note 4)

The base station gateway apparatus according to supplementary note 1 or 2, wherein
 the handover is a handover using an X2 interface; and
 the U-plane processing unit inserts the end marker into the U-plane data at a timing of receiving an S1AP: Path Switch Request message from the target base station.

(Supplementary Note 5)

A base station gateway apparatus that is connected to a mobility management apparatus, a serving gateway apparatus and subordinate base stations and that controls the subordinate base stations, the base station gateway apparatus comprising:
 a C-plane processing unit; and
 a U-plane processing unit; wherein
 when a mobile station performs handover from a subordinate source base station to a subordinate target base station, the C-plane processing unit relays S1AP signaling received from the source base station and the target base station to the mobility management apparatus without terminating the S1AP signaling; and
 the U-plane processing unit inserts, into U-plane data that is received from the serving gateway apparatus and that is to be transferred to the source base station, an end marker indicating that the U-plane data is the last data at a predetermined timing, and
 the U-plane processing unit switches a transfer destination of the U-plane data, received from the serving gateway apparatus, from the source base station to the target base station at a timing immediately after the end marker is inserted.

(Supplementary Note 6)

The base station gateway apparatus according to supplementary note 5, wherein the handover is a handover using an S1 interface; and the U-plane processing unit inserts the end marker into the U-plane data at a timing of receiving an S1AP: Handover Notify message from the target base station, and the U-plane processing unit discards the end marker if receiving U-plane data, in which the end marker is inserted, from the serving gateway apparatus.

(Supplementary Note 7)

The base station gateway apparatus according to supplementary note 5, wherein the handover is a handover using an X2 interface; and the U-plane processing unit inserts the end marker into the U-plane data at a timing of receiving an S1AP: Path Switch Request message from the target base station, and the U-plane processing unit discards the end marker if receiving U-plane data, in which the end marker is inserted, from the serving gateway apparatus.

(Supplementary Note 8)

The base station gateway apparatus according to supplementary note 5, wherein the handover is a handover using an S1 interface or X2 interface: and the U-plane processing unit inserts the end marker into the U-plane data at a timing of receiving U-plane data, in which the end marker is inserted, from the serving gateway apparatus.

(Supplementary Note 9)

A wireless communication system comprising a mobility management apparatus, a serving gateway apparatus, base stations, a mobile station, and a base station gateway apparatus that is connected to the mobility management apparatus, the serving gateway apparatus and subordinate base stations and that controls the subordinate base stations, wherein when the mobile station performs handover from a subordinate source base station to a subordinate target base station, the base station gateway apparatus terminates S1AP signaling received from the source base station and the target base station without relaying the S1AP signaling to the mobility management apparatus, the base station gateway apparatus inserts, into U-plane data that is received from the serving gateway apparatus and that is to be transferred to the source base station, an end marker indicating that the U-plane data is the last data at a predetermined timing, and the base station gateway apparatus switches a transfer destination of the U-plane data, received from the serving gateway apparatus, from the source base station to the target base station at a timing immediately after the end marker is inserted.

(Supplementary Note 10)

The wireless communication system according to supplementary note 9, wherein the base station gateway apparatus stores a security key and an NCC acquired from the mobility management apparatus when the mobile station connects to the base station gateway apparatus for the first time, and the base station gateway apparatus sets the stored security key and NCC for S1AP signaling to be transmitted to the target base station.

(Supplementary Note 11)

The wireless communication system according to supplementary note 9 or 10, wherein the handover is a handover using an S1 interface; and the base station gateway apparatus inserts the end marker into the U-plane data at a timing of receiving an S1AP: Handover Notify message from the target base station.

(Supplementary Note 12)

The wireless communication system according to supplementary note 9 or 10, wherein the handover is a handover using an X2 interface; and the base station gateway apparatus inserts the end marker into the U-plane data at a timing of receiving an S1AP: Path Switch Request message from the target base station.

(Supplementary Note 13)

A wireless communication system comprising a mobility management apparatus, a serving gateway apparatus, base stations, a mobile station, and a base station gateway apparatus that is connected to the mobility management apparatus, the serving gateway apparatus and subordinate base stations and that controls the subordinate base stations, wherein when the mobile station performs handover from a subordinate source base station to a subordinate target base station, the base station gateway apparatus relays S1AP signaling received from the source base station and the target base station to the mobility management apparatus without terminating the signaling;

the base station gateway apparatus inserts, into U-plane data that is received from the serving gateway apparatus and that is to be transferred to the source base station, an end marker indicating that the U-plane data is the last data at a predetermined timing, and the base station gateway apparatus switches a transfer destination of the U-plane data, received from the serving gateway apparatus, from the source base station to the target base station at a timing immediately after the end marker is inserted.

(Supplementary Note 14)

The wireless communication system according to supplementary note 13, wherein the handover is a handover using an S1 interface; and the base station gateway apparatus inserts the end marker into the U-plane data at a timing of receiving an S1AP: Handover Notify message from the target base station, and the base station gateway apparatus discards the end marker if receiving U-plane data, in which the end marker is inserted, from the serving gateway apparatus.

(Supplementary Note 15)

The wireless communication system according to supplementary note 13, wherein the handover is a handover using an X2 interface; and the base station gateway apparatus inserts the end marker into the U-plane data at a timing of receiving an S1AP: Path Switch Request message from the target base station, and the base station gateway apparatus discards the end marker if receiving U-plane data, in which the end marker is inserted, from the serving gateway apparatus.

(Supplementary Note 16)

The wireless communication system according to supplementary note 13, wherein the handover is a handover using an S1 interface or X2 interface; and the base station gateway apparatus inserts the end marker into the U-plane data at a timing of receiving U-plane data, in which the end marker is inserted, from the serving gateway apparatus.

(Supplementary Note 17)

A communication method by a base station gateway apparatus that is connected to a mobility management apparatus, a serving gateway apparatus and subordinate base stations and that controls the subordinate base stations, the method comprising the steps of:

when a mobile station performs handover from a subordinate source base station to a subordinate target base station, terminating S1AP signaling received from the source base station and the target base station without relaying the S1AP signaling to the mobility management apparatus;

inserting, into U-plane data that is received from the serving gateway apparatus and that is to be transferred to the source base station, an end marker indicating that the U-plane data is the last data at a predetermined timing; and switching a transfer destination of the U-plane data, received from the serving gateway apparatus, from the source base station to the target base station at a timing immediately after the end marker is inserted.

(Supplementary Note 18)

The communication method according to supplementary note 17 further comprising the steps of:

storing a security key and an NCC acquired from the mobility management apparatus when the mobile station connects to the base station gateway apparatus for the first time; and setting the stored security key and NCC for S1AP signaling to be transmitted to the target base station.

(Supplementary Note 19)

The communication method according to supplementary note 17 or 18, wherein the handover is a handover using an S1 interface; and the predetermined timing is a timing of receiving an S1AP: Handover Notify message from the target base station.

(Supplementary Note 20)

The communication method according to supplementary note 17 or 18, wherein the handover is a handover using an X2 interface; and the predetermined timing is a timing of receiving an S1AP: Path Switch Request message from the target base station.

(Supplementary Note 21)

A communication method by a base station gateway apparatus that is connected to a mobility management apparatus, a serving gateway apparatus and subordinate base stations and that controls the subordinate base stations, the method comprising the steps of:

when a mobile station performs handover from a subordinate source base station to a subordinate target base station, relaying S1AP signaling received from the source base station and the target base station to the mobility management apparatus without terminating the signaling;

inserting, into U-plane data that is received from the serving gateway apparatus and that is to be transferred to the source base station, an end marker indicating that the U-plane data is the last data at a predetermined timing; and switching a transfer destination of the U-plane data, received from the serving gateway apparatus, from the source base station to the target base station at a timing immediately after the end marker is inserted.

(Supplementary Note 22)

The communication method according to supplementary note 21, wherein the handover is a handover using an S1 interface; and the predetermined timing is a timing of receiving an S1AP: Handover Notify message from the target base station; and the communication method further comprises a step of discarding the end marker if receiving U-plane data, in which the end marker is inserted, from the serving gateway apparatus.

(Supplementary Note 23)

The communication method according to supplementary note 21, wherein the handover is a handover using an X2 interface; and the predetermined timing is a timing of receiving an S1AP: Path Switch Request message from the target base station, and the communication method further comprises a step of discarding the end marker if receiving U-plane data, in which the end marker is inserted, from the serving gateway apparatus.

(Supplementary Note 24)

The communication method according to supplementary note 21, wherein the handover is a handover using an S1 interface or X2 interface; and the predetermined timing is a timing of receiving U-plane data, in which the end marker is inserted, from the serving gateway apparatus.

The present application claims priority based on Japanese Patent Application No. 2012-88271 filed on Apr. 9, 2012, the disclosure of which is hereby incorporated by reference thereto in its entirety.

The invention claimed is:

1. A base station gateway apparatus that is connected to a mobility management apparatus, a serving gateway apparatus and subordinate base stations and that controls the subordinate base stations, the base station gateway apparatus comprising:

a C-plane processing unit; and a U-plane processing unit; wherein when a mobile station performs handover from a subordinate source base station to a subordinate target base station, said C-plane processing unit terminates S1AP signaling received from the source base station and the target base station without relaying the S1AP signaling to the mobility management apparatus; and said U-plane processing unit inserts, into U-plane data that is received from the serving gateway apparatus and that is to be transferred to the source base station, an end marker indicating that the U-plane data is the last data at a predetermined timing, and said U-plane processing unit switches a transfer destination of the U-plane data, received from the serving gateway apparatus, from the source base station to the target base station at a timing immediately after the end marker is inserted.

2. The base station gateway apparatus according to claim 1, further comprising a storage unit that stores a security key and an NCC acquired from the mobility management apparatus when the mobile station connects to the base station gateway apparatus for the first time; wherein said C-plane processing unit sets the security key and the NCC stored in said storage unit for S1AP signaling to be transmitted to the target base station.

3. The base station gateway apparatus according to claim 1, wherein the handover is a handover using an S1 interface; and said U-plane processing unit inserts the end market into the U-plane data at a timing of receiving an S1AP: Handover Notify message from the target base station.

4. The base station gateway apparatus according to claim 1, wherein the handover is a handover using an X2 interface; and said U-plane processing unit inserts the end marker into the U-plane data at a timing of receiving an S1AP: Path Switch Request message from the target base station.

5. A base station gateway apparatus that is connected to a mobility management apparatus, a serving gateway apparatus and subordinate base stations and that controls the subordinate base stations, the base station gateway apparatus comprising:
- a C-plane processing unit; and
- a U-plane processing unit; wherein
- when a mobile station performs handover from a subordinate source base station to a subordinate target base station, said C-plane processing unit relays S1AP signaling received from the source base station and the target base station to the mobility management apparatus without terminating the S1AP signaling; and
- said U-plane processing unit inserts, into U-plane data that is received from the serving gateway apparatus and that is to be transferred to the source base station, an end marker indicating that the U-plane data is the last data at a predetermined timing, and
- said U-plane processing unit switches a transfer destination of the U-plane data, received from the serving gateway apparatus, from the source base station to the target base station at a timing immediately after the end marker is inserted.

6. The base station gateway apparatus according to claim 5, wherein
- the handover is a handover using an S1 interface; and
- said U-plane processing unit inserts the end marker into the U-plane data at a timing of receiving an S1AP: Handover Notify message from the target base station, and
- said U-plane processing unit discards the end marker if receiving U-plane data, in which the end marker is inserted, from the serving gateway apparatus.

7. The base station gateway apparatus according to claim 5, wherein
- the handover is a handover using an X2 interface; and
- said U-plane processing unit inserts the end marker into the U-plane data at a timing of receiving an S1AP: Path Switch Request message from the target base station, and
- said U-plane processing unit discards the end marker if receiving U-plane data, in which the end marker is inserted, from the serving gateway apparatus.

8. The base station gateway apparatus according to claim 5, wherein
- the handover is a handover using an S1 interface or X2 interface; and
- said U-plane processing unit inserts the end marker into the U-plane data at a timing of receiving U-plane data, in which the end marker is inserted, from the serving gateway apparatus.

9. A wireless communication system comprising a mobility management apparatus, a serving gateway apparatus, base stations, a mobile station, and a base station gateway apparatus that is connected to said mobility management apparatus, said serving gateway apparatus and subordinate base stations and that controls said subordinate base stations, wherein
- when said mobile station performs handover from a subordinate source base station to a subordinate target base station, said base station gateway apparatus terminates S1AP signaling received from the source base station and target base station without relaying the S1AP signaling to said mobility management apparatus,
- said base station gateway apparatus inserts, into U-plane data that is received from said serving gateway apparatus and that is to be transferred to the source base station, an end marker indicating that the U-plane data is the last data at a predetermined timing, and
- said base station gateway apparatus switches a transfer destination of the U-plane data, received from said serving gateway apparatus, from the source base station to the target base station at a timing immediately after the end marker is inserted.

10. A communication method by a base station gateway apparatus that is connected to a mobility management apparatus, a serving gateway apparatus and subordinate base stations and that controls the subordinate base stations, the method comprising the steps of:
- when a mobile station performs handover from a subordinate source base station to a subordinate target base station, terminating S1AP signaling received from the source base station and the target base station without relaying the S1AP signaling to the mobility management apparatus;
- inserting, into U-plane data that is received from the serving gateway apparatus and that is to be transferred to the source base station, an end marker indicating that the U-plane data is the last data at a predetermined timing; and
- switching a transfer destination of the U-plane data, received from the serving gateway apparatus, from the source base station to the target base station at a timing immediately after the end marker is inserted.

11. The base station gateway apparatus according to claim 2, wherein
- the handover is a handover using an S1 interface; and
- said U-plane processing unit inserts the end marker into the U-plane data at a timing of receiving an S1AP: Handover Notify message from the target base station.

12. The base station gateway apparatus according to claim 2, wherein
- the handover is a handover using an X2 interface; and
- said U-plane processing unit inserts the end marker into the U-plane data at a timing of receiving an S1AP: Path Switch Request message from the target base station.

* * * * *